Figure 1:
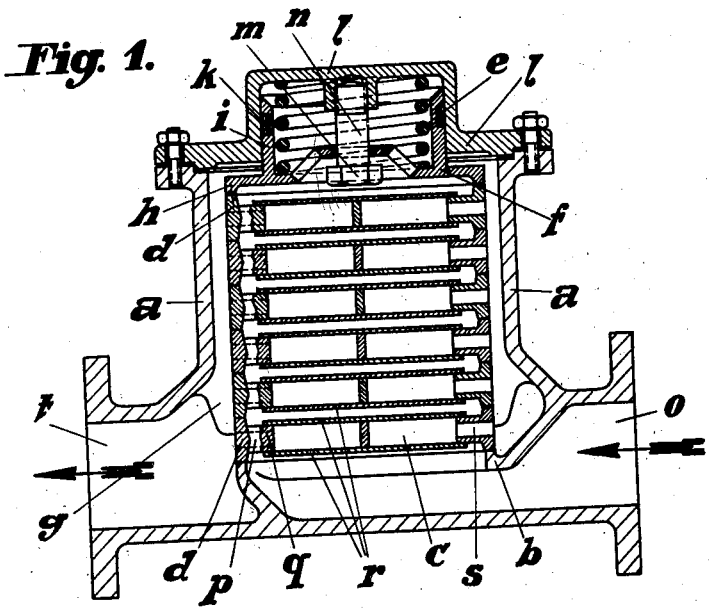

Aug. 2, 1932.　　　　M. TISCHER　　　　1,869,589
FILTER FOR LIQUIDS AND GASES
Filed March 3, 1930

Inventor:
Max Tischer

Patented Aug. 2, 1932

1,869,589

UNITED STATES PATENT OFFICE

MAX TISCHER, OF AUGSBURG, GERMANY

FILTER FOR LIQUIDS AND GASES

Application filed March 3, 1930, Serial No. 432,951, and in Germany March 2, 1929.

The fault of known filters for liquids and gases is, that in case the filtering fabric or other material becomes clogged, consequent excessive differences in pressure of the filtered stuff within the filter and the raw stuff outside it may lead to damage to the filter and annoying stoppages. The object of the invention is a filter without this fault. According to the invention as soon as a certain maximum difference in pressure between the filtered and unfiltered stuff is exceeded, slit like openings are formed in the filter through which an equalization of pressure takes place at once, the slits at the same time also operating as filters. To this end filter cells are piled up and held together by means of a suitably disposed compression spring in such manner that they are free to move apart, if a certain degree of difference in pressure is exceeded.

The drawing shows a preferred form of the object of the invention.

Figure 2:
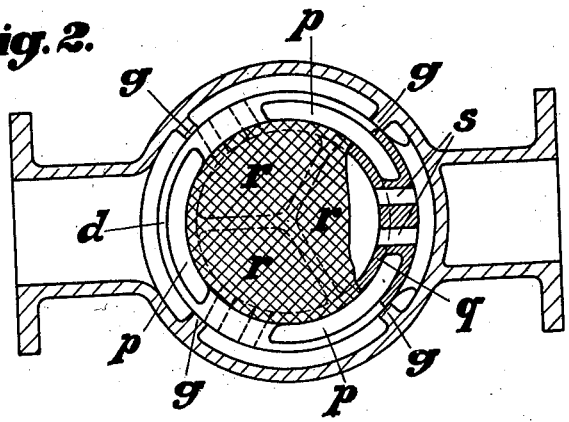

Fig. 1 represents a longitudinal section;
Fig. 2 is a cross section of the new filter.

$b$ is a circular seat in the casing $a$, upon which the outer wall portion $d$ of the first of the circular disk like filter cells $c$ rests. In like manner the second cell is resting upon the lowermost of the cells, the third upon the second and so on. Upon the top cell the cover $f$ rests. A compression spring $e$ bearing upon the inside of casing lid $l$ presses the cover against the outer wall portion of the top filter cell $c$. In this way the spring also holds all the other cells together and presses the bottom cell upon the seat $b$. Casing ribs $g$ keep the cells in central position.

The upper part of cover $f$ forms a balancing step piston $i$ with packing $k$, which piston slides in the casing lid $l$ shaped as a guiding cylinder for this purpose. In order to prevent the spring pushing the cover $f$ outside the guiding cylinder if lid $l$ is taken off, a stud bolt $n$ is fastened to the bottom of lid $l$ so that cover $f$ will rest upon the stud $m$ of bolt $n$, if lid $l$ is taken off. When in working order, there is a certain amount of play between stud $m$ of bolt $n$ and the stud rest part of the cover $f$, in order to allow the spring to press the cover against the top cell.

Each filter cell $c$ consists of a main body $q$, over which suitable filtering fabric $r$ is strained and, united to the main body by ribs, an outer wall portion $d$.

The resilient means adapted to press the lid separating the filtered substance from the unfiltered part of the substance against the upper filtering cell act with a force given by the ratio of the diameter of the step piston connected with said lid to the diameter of said lid.

The liquid or gaseous stuff to be filtered passes through the filter as follows.

The liquid or gas enters the casing at $o$, flowing through circular channels $p$, thus distributing itself in parallel upon all the filter cells. The outer wall portion $d$ of each cell is slightly higher than the filter body $q$, consequently the liquid or gas may freely enter and distribute itself in the space between the several cells upon the fabric stretched over the filter bodies and, penetrating the filter fabric enters the interior of the bodies $q$. Thence the now filtered liquid or gas flows through bores $s$ into the casing $a$ and eventually is discharged through outlet $t$.

If the desirable maximal difference in pressure between filtered stuff and raw stuff is exceeded, excess pressure of the raw stuff will lift cover $f$ and a narrow slit like opening will form between seat surface $h$ and circular seat $d$ of the top cell $c$, some of the liquid or gas passes into the casing $a$ and pressure is thus at once equalized. As the width of this slit is only very minute, approximately the same filter effect is obtained as with the filter fabric. The construction of the filter according to the invention admits the choice of cells of the largest diameter, thereby ensuring any desired width of filter slits.

Similar action takes place between the seats of any pair of cells if through clogging up of one of them resistance in the circular channels $p$ rises inadmissibly high.

Claims:
1. In a filter for liquids or gases, in combination a casing, a filtering member therein comprising a plurality of superposed filtering cells, each cell consisting of a ring shaped body and an outer ring shaped wall thus forming a circular channel, said channels communicating with spaces between the cells and a section of said casing having an inlet, filter fabric stretched over both ends of each of said ring shaped cell bodies enclosing a space communicating by bores in the wall of said filter bodies with another division of the casing having an outlet, a piston shaped lid on top of said series of cells and a compression spring within said lid adapted to press said lid and series of cells against a seat provided in the lower portion of said casing.

2. In a filter for liquids or gases, in combination a casing having a section provided with an inlet and a section provided with an outlet and a cylindrical cover, a filtering member within said casing comprising a series of superposed disk like filter cells and a step piston shaped lid on top of said cells, partially encompassed by said cylindrical cover, said lid adapted to ascend within said cover, if the pressure prevailing in the space between said cells exceeds the pressure prevailing inside anyone of said series of cells by a certain predetermined amount, thereby establishing direct communication with the division of said casing having an outlet, and means for limiting said ascending motion of the lid to a degree compatible with proper filtering.

3. In a filter for liquids or gases, in combination a casing having a section provided with an inlet and a section provided with an outlet, a filtering member within said casing comprising a series of superposed disk like filter cells, each of said cells adapted to leave its seat if pressure prevailing in the space below the cell exceeds the pressure within the cell by a certain predetermined amount, thereby establishing direct communication with the division of said casing having an outlet, and means for limiting said motion to a degree compatible with proper filtering.

4. In a filter for liquids or gases, in combination, a filtering member comprising a plurality of superposed filtering cells, a casing, a lid separating the filtered substance from the unfiltered part of the substance, a step piston connected with said lid and resilient means adapted to press said lid against the upper one of said filtering cells and to raise said lid at a certain pressure, thereby forming an outlet for said unfiltered substance, the effective lifting force being a function of the ratio of the diameter of said piston to the diameter of said lid.

5. In a filter for liquids or gases, in combination, a filtering member comprising a plurality of superposed filtering cells, said filtering cells comprising main bodies, fabrics strained over said bodies, outer walls and hollow ribs connecting said walls with said bodies, said main bodies and said outer walls forming channels surrounding said main bodies for the purpose of leading the unfiltered substance into the filter, a lid separating the filtered substance from the unfiltered part of the substance, a casing, said casing and said outer walls forming channels for the passage of said filtered substance leaving the first-mentioned channels by means of said hollow ribs.

6. In a filter for liquids or gases, in combination, a filtering member comprising a plurality of superposed filtering cells, a casing, a lid separating the filtered substance from the unfiltered part of the substance and resilient means adapted to press said lid against the upper one of said filtering cells, said lid being automatically raised at a certain excess of pressure and forming an outlet for said unfiltered substance, said outlet being adapted to act as a filter.

In testimony whereof I have affixed my signature.

MAX TISCHER.